United States Patent
Groetzner et al.

(10) Patent No.: US 8,365,182 B2
(45) Date of Patent: Jan. 29, 2013

(54) METHOD AND SYSTEM FOR PROVISIONING OF RESOURCES

(75) Inventors: Michael Groetzner, Stuttgart (DE); Horst Sinram, Schoenaich (DE); Stefan Wirag, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 1217 days.

(21) Appl. No.: 11/861,681

(22) Filed: Sep. 26, 2007

(65) Prior Publication Data

US 2008/0082983 A1 Apr. 3, 2008

(30) Foreign Application Priority Data

Oct. 2, 2006 (EP) .................................... 06121642

(51) Int. Cl.
*G06F 9/46* (2006.01)
*G06F 15/173* (2006.01)

(52) U.S. Cl. ........................ 718/104; 709/226

(58) Field of Classification Search .................. 718/104, 718/1

See application file for complete search history.

(56) References Cited

U.S. PATENT DOCUMENTS

| | | | | |
|---|---|---|---|---|
| 5,473,773 A * | 12/1995 | Aman et al. | ................. | 718/104 |
| 6,625,638 B1 * | 9/2003 | Kubala et al. | ................. | 718/105 |
| 6,957,435 B2 * | 10/2005 | Armstrong et al. | ........... | 718/104 |
| 7,290,259 B2 * | 10/2007 | Tanaka et al. | ..................... | 718/1 |
| 7,752,623 B1 * | 7/2010 | Crawford, Jr. | ................. | 718/104 |
| 8,260,893 B1 * | 9/2012 | Bandhole et al. | ............. | 709/223 |
| 2002/0194251 A1 * | 12/2002 | Richter et al. | ................ | 709/105 |
| 2003/0212884 A1 * | 11/2003 | Lee et al. | .......................... | 713/1 |
| 2005/0166204 A1 * | 7/2005 | Takatsu et al. | ................ | 718/100 |
| 2005/0188088 A1 * | 8/2005 | Fellenstein et al. | ........... | 709/226 |
| 2006/0230149 A1 * | 10/2006 | Jackson | ........................ | 709/226 |
| 2006/0265470 A1 * | 11/2006 | Rolia et al. | ..................... | 709/217 |
| 2007/0067606 A1 * | 3/2007 | Lin et al. | ......................... | 712/10 |

OTHER PUBLICATIONS

Lassettre et al, "Dynamic Surge Protection: An Approach to Handling Unexpected Workload Surges With Resource Actions That Have Lead Times", International Federation for Information Processing, 2003, pp. 82-92.*

* cited by examiner

*Primary Examiner* — Jennifer To
(74) *Attorney, Agent, or Firm* — Cantor Colburn LLP; William A. Kinnaman, Jr.

(57) ABSTRACT

A method of autonomous provisioning of resources of a computer system, wherein: performance-critical workload of the computer system is monitored; workload suffering is detected based on comparing the performance-critical workload with defined values of performance-critical workload goals; types of missing resources are determined; additional resources available for activation are determined; the additional resources are activated, and a notification of the activation is generated for being sent to a system provider for automated billing of the added capacity, and a computer device, data processing program, computer program product, and computer data signal therefor.

19 Claims, 5 Drawing Sheets

METHOD AND SYSTEM FOR PROVISIONING OF RESOURCES

CROSS-REFERENCE TO RELATED APPLICATION

This application claims the priority benefit under 35 U.S.C. §119 of European application 06121642.0, filed Oct. 2, 2006, and incorporated herein by reference.

BACKGROUND OF THE INVENTION

1. Field of the Invention

The invention relates to a method of autonomous provisioning of resources of a computer system, and a computer device, data processing program, computer program product, and computer data signal therefor.

2. Description of the Related Art

In an environment of quickly changing demand for computing resources, there is a need to handle changing workloads by providing additional processing capacity for a computer system, so that given performance objectives can be achieved. A key element to enable that capability is provisioning, by which resources are made available when needed.

In the state of the art, various different types of provisioning methods are generally known:

System or image provisioning, such as the creation or cloning of operating system instances, including installation of required subsystems and applications, is a horizontal (scale-out) provisioning method in distributed environments. This method requires that additional separate hardware is available. Since an additional software stack is needed, for example, operating system and application, additional software licenses are required. Such provisioning is only applicable for systems with single applications, for example, a database server or a web server. Moreover, under certain circumstances, provisioning of additional resources is performed, even when some of the present processing capacity on the system is still unused. This is due to a use of simple metrics for deciding whether provisioning shall be performed, for example, the average response time for a transaction. Further, after the resources are made available, they require to be populated to the work distribution system and to be removed if they are no longer needed.

Container provisioning, such as the creation of logic partitions (LPARs) or virtual machines, differs from system provisioning in that the additional system is started on the same hardware.

Subsystem provisioning, i.e. creation of additional instances of subsystems, is another type of provisioning. On the z/OS operating system, a workload manager (WLM) is enabled to control the number of server instances, such as the number of batch initiators or the number of WebSphere Application Server regions, based on demand and business importance. This method involves currently available resources and provisions new software that is enabled to assume these resources.

U.S. Pat. No. 5,473,773 discloses a workload manager creating goal control data and a system resource manager causing these goals to be met by periodically sampling work unit status. In this patent, a workload manager manages accessing existing resources. Once the physical capacity of the computer system is in use, it can merely displace less important work to ensure that the higher important work maintains its defined goals. However, displacing less important work may not be warranted and may adversely affect higher important work.

Besides managing access to computing resources a workload manager usually offers a monitoring interface that provides data describing the activity of workloads such as resource consumption, performance indicators, and reasons why work was delayed.

Capacity provisioning, such as providing additional processors, memory, I/O bandwidth, and storage is a method of manual provisioning generally known in the state of the art. Capacity provisioning is the vertical (scale-up) counterpart to system provisioning, i.e. the processing capacity of an existing server is increased to handle additional work.

For manually performing capacity provisioning, a customer usually makes use of system monitoring subsystems, such as Resource Measurement Facility (RMF). Such products collect resource utilization and delay data from the Workload Manager and provide statistics about the usage of resources over time. They do also gather utilization, capacity, and configuration data from the underlying hardware. If virtualization facilities, such as zSeries Logical Partitions (LPAR) exist, data from the virtualization layer are included. If the workload performed in the user systems no longer reaches their given performance goals, as can be seen from the measurement data of the monitoring products, an operator manually activates temporary resources. However, the activation and deactivation of temporary resources usually does not occur at an optimal point of time, and thus is often performed too late, or too early. Moreover, sometimes improper resources are activated instead of suitable ones. In such a case, a suffering workload is not balanced since the current bottleneck of the system is missed, e.g. in case a general purpose processor is activated when a workload needs more memory. Such problems may occur because an operator may not monitor all metrics that are necessary to identify the appropriate missing resources correctly.

Consequently, it is an object of the present invention to provide a method and system for capacity provisioning that solves the issue of human errors and overcomes limitations in performance data analysis when performing capacity provisioning.

SUMMARY OF THE INVENTION

This object is achieved by the features of each of the main claims.

One aspect of the present invention contemplates a method of autonomous provisioning of resources of a computer system, wherein performance-critical workload of the computer system is monitored; workload suffering is detected based on comparing the performance-critical workload with defined values of performance-critical workload goals; types of missing resources are determined; additional resources available for activation are determined; the additional resources are activated, and a notification of the activation may be generated for being sent to a system provider, e.g. for automated billing of the added capacity.

This aspect of the invention contemplates a method in which the process of capacity provisioning is automatically and autonomously performed, so that human interaction is avoided and a large number of different performance metrics can be evaluated, resulting in a quick, timely, and dynamic response to increasing workload while offering a mechanism for the system vendor to keep informed of the provisioned system components, for instance, to allow appropriate billing.

By monitoring performance-critical workload of the computer system, the appropriate data basis for performing a dynamic provisioning of additional system resources is evaluated, for instance, measurement data of current system utilization (operating system and/or hardware) and/or in which way the workload achieves given workload goals.

By detecting workload suffering based on comparing the performance-critical workload with defined values of performance-critical workload goals, it is enabled to analyze measured workload in relation to a given defined complex set of criteria, such as conditions specified in a capacity provisioning policy data structure, and to establish if a workload suffering is presently existent.

By determining the types of missing resources, it is provided that a potential activation of additional resources is directed towards such resources that are appropriate for relieving the workload suffering (i.e., that remove the bottleneck).

By determining additional resources available for activation and activating the additional resources, additional resources are actually activated, and can be added to the general workload management process used in the computer system. The resources being handled may include processor resources, including special purpose processors where applicable, as well as other resources such as memory or I/O bandwidth. The resource provisioning may provide additional resources, such as zSeries processors or channels, or change the capability (speed) of resources.

When a notification of the activation is generated for being sent to a system provider for automated billing of the added capacity, a system vendor is automatically informed about the activation process so that an automated billing procedure can be applied according to the added performance.

Another aspect of the present invention contemplates a computer device for performing the method above, comprising a workload manager component, and further comprising a capacity provisioning manager component coupled to the workload manager component, the capacity provisioning manager component comprising: a metric monitor component configured to monitor performance-critical workload of the computer system based on workload information received from the workload manager component; a workload analyzer component configured to detect a workload suffering event based on comparing the performance-critical workload with defined values of performance-critical workload goals, and further configured to determine the types of missing resources; a provisioning planner component configured to coordinate a plurality of workload suffering events and control resource activation accordingly; a resource manager component configured to determine additional resources available for activation and to perform resource activation.

By providing these components, appropriate means are given to perform corresponding features of the above method, while these components offer the same advantageous effects as the corresponding method steps. In addition, a provisioning planner component is given that is configured to coordinate a plurality of workload suffering events and control resource activation accordingly. Thus, resource activation (and/or deactivation) can be optimized for an amount of workload sufferings (i.e., workload suffering events) at the same time in the same computer system.

Other aspects of the invention contemplate a corresponding data processing program, computer program product, and computer data signal and will be explained later.

The invention can be further embodied as specified in the subclaims that depend on the independent claims, as briefly outlined below and further described in the detailed description:

In an embodiment of the method according to the invention, the performance-critical workload is classified in service classes. In this way, it can be ensured that activated resources are used consistently by the workload manager present in the computer system. Accordingly, in a further embodiment, the performance-critical workload is prioritized by mapping it to service classes to reflect the performance-critical workload goals.

Further, detecting workload suffering can, in one embodiment, comprise evaluating if the difference evaluated from comparing the performance-critical workload with defined values of performance-critical workload goals matches a certain condition. Accordingly, such a condition can be selected from a capacity provisioning policy stored in a memory of the computer system.

In an embodiment of the method, the additional resources are activated using a defined interface to an operating system of the computer system. Further, the additional resources may comprise hardware components having a, optionally standardized, interface for being activated.

In another embodiment of the method, generating a notification comprises including information enabling to determine which resources have been activated since the activation procedure and/or since initial start-up of the computer system.

Moreover, monitoring of performance-critical workload and detecting workload suffering may be performed by a workload manager component.

In order to allow for dynamic adaptation of computing resources to occurring workload (that is, increasing workload as well as decreasing workload) resources are, in one embodiment, deactivated based on comparing the performance-critical workload with defined values of performance-critical workload goals. Thus, provisioning can be performed as demand occurs, and it is enabled to appropriately perform automated billing.

In further embodiments of the method, detecting suffering workload comprises calculating a performance index value PI for response time goals and/or execution velocity goals, as specified with regard to the preferred embodiment further below. In an embodiment, detecting suffering workload further comprises detecting if the calculated PI exceeds a given threshold value for a given amount of time.

In another embodiment, determining resource requirements comprises detecting if additional zIIP processor capacity is required, including the following steps: Determining if, on the condition processors of the computer system are shared with other operating systems, the sum of all zIIP processors of all operating systems is higher than the number of physical zIIP processors provided by the hardware; determining the amount of all logical zIIP processors exceeding the number of physical zIIP processors; determining if the physical utilization of the currently active zIIP processors exceeds a given threshold; determining if the operating system utilization of the currently active zIIP processors exceeds a given threshold; determining eligibility of the suffering workload for using a zIIP processor, and may further comprise one or more of the following steps: detecting a work overflow of zIIP processors; determining a delay contribution value of zIIP processors; determining the share of the zIIP processors in the logical partition, and issuing a request for zIIP activation.

In an embodiment of the computer device according to the present invention, the capacity provisioning manager component is coupled to a data storage comprising a capacity provisioning policy that contains statements of condition for activating resources, the capacity provisioning policy being evaluated by the workload analyzer component for performing the comparison between the performance-critical workload and defined values of performance-critical workload goals. Accordingly, in a further embodiment, the statements of condition are time conditions and/or service class conditions.

In another embodiment, the provisioning planner component is configured to aggregate workload suffering events and evaluates whether additional resources need to be activated. Thus, resources can be optimized by coordinating multiple capacity demands.

Further, in one embodiment, the resource manager component is further configured to perform resource deactivation and the provisioning planner component is further configured to determine whether currently active resources can be deactivated based on the aggregate workload suffering events.

The invention and its embodiments will be further described and explained using several figures.

DETAILED DESCRIPTION

Figure 1:
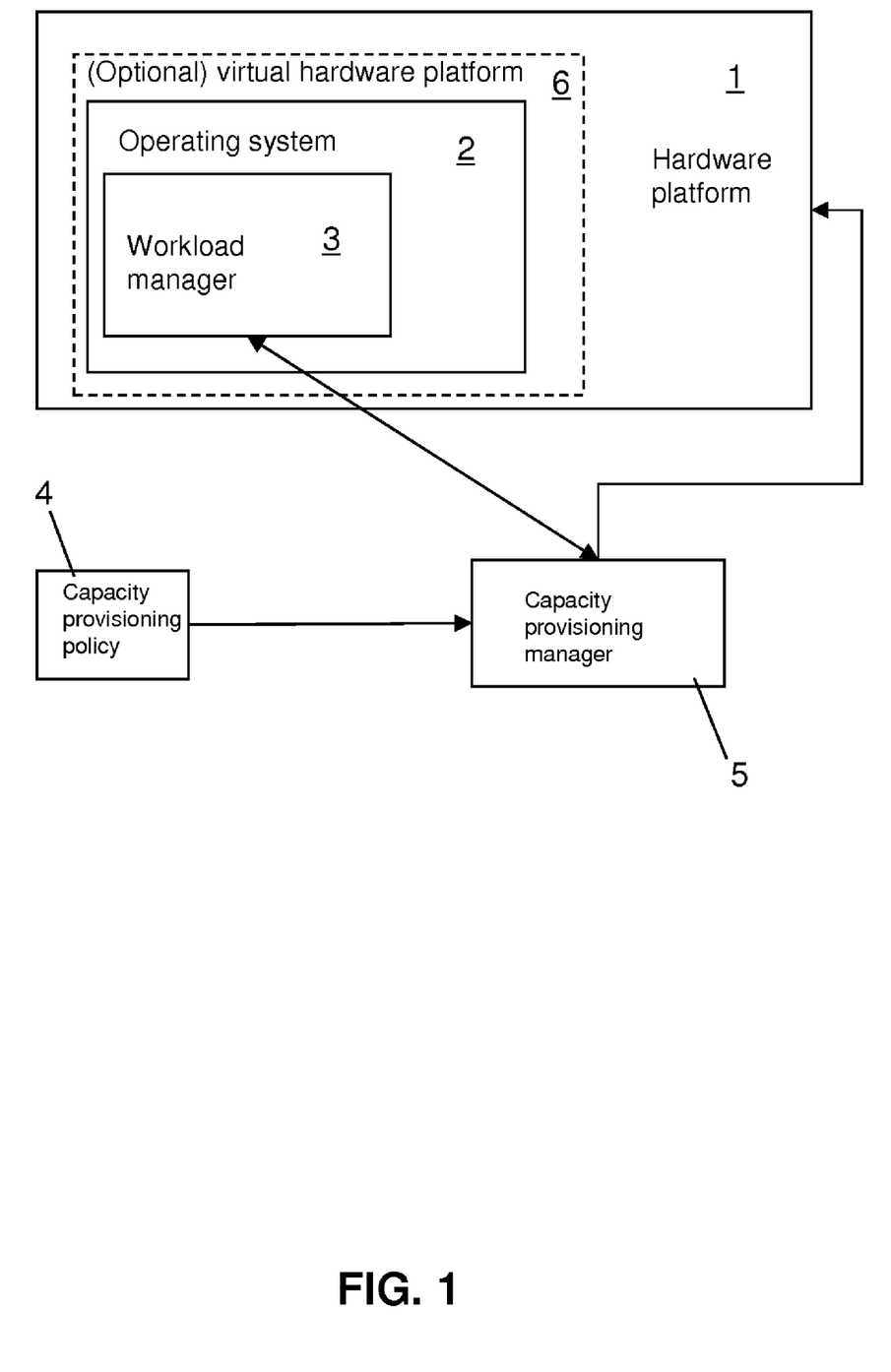
FIG. 1 is a block diagram showing a general system overview of an embodiment of the present invention.

FIG. 1 gives an overview of a system in which an embodiment of the invention is implemented. On computer hardware 1, an operating system 2 is installed and is being executed. Operating system 2 contains a workload manager component 3, which is communicating with a capacity provisioning manager component 5. Further, capacity provisioning manager component 5 accesses a capacity provisioning policy data structure 4 stored in a memory and also accesses computer hardware 1. The embodiment may also comprise virtualization facilities, such as zSeries Logical Partitions (LPAR), that make a virtual server environment 6 available.

Computer hardware 1 is, in this case, an IBM zSeries server, which has been delivered with spare (dormant) physical hardware components that have been ordered by a customer. Such spare components are available for activation when other components fail, or to provide additional processing capacity if the computing demand increases.

Such resources are, for example, processors that can be used as general purpose processors or specific devices like IBM zSeries Application Assist Processors (zAAP) or z9 Information Integration Processors (zIIP). Such inactive resources can temporarily be activated, for example via On/Off Capacity on Demand (OOCoD) and related technologies (e.g. Capacity BackUp (CBU)). Typically, customers are required to purchase such temporary activation.

Further, server 1 provides an interface for accessing resource activation and deactivation mechanisms so as to make additional data processing resources available for system use. This interface moreover enables to determine the additional capacity that is temporarily available. For z/Series machines, the hardware itself manages the resources using a Service Element (SE) or by a Hardware Management Console (HMC). It provides also interfaces to query the current status of the temporary resources and to activate/deactivate these resources. A z/Series machine, for example, allows using the Simple Network Management Protocol (SNMP) to communicate with the hardware. Using this interface it can be queried, how many spare processors are available, how many resources of a specific type are allowed to be activated, and what is the current activation level (how many of these resources are active).

Other hardware may use different protocols as, for example, Common Information Model (CIM).

Within server operating system 2, in the present example IBM z/OS, workload manager component 3 manages workloads based on performance goals defined within a policy. This component prioritizes the work of the programs within the operating system and assigns to them processing resources such that the defined performance goals can be fulfilled. Workloads of similar type and management criteria are grouped into specific service classes by workload manager component 3.

Figure 4:
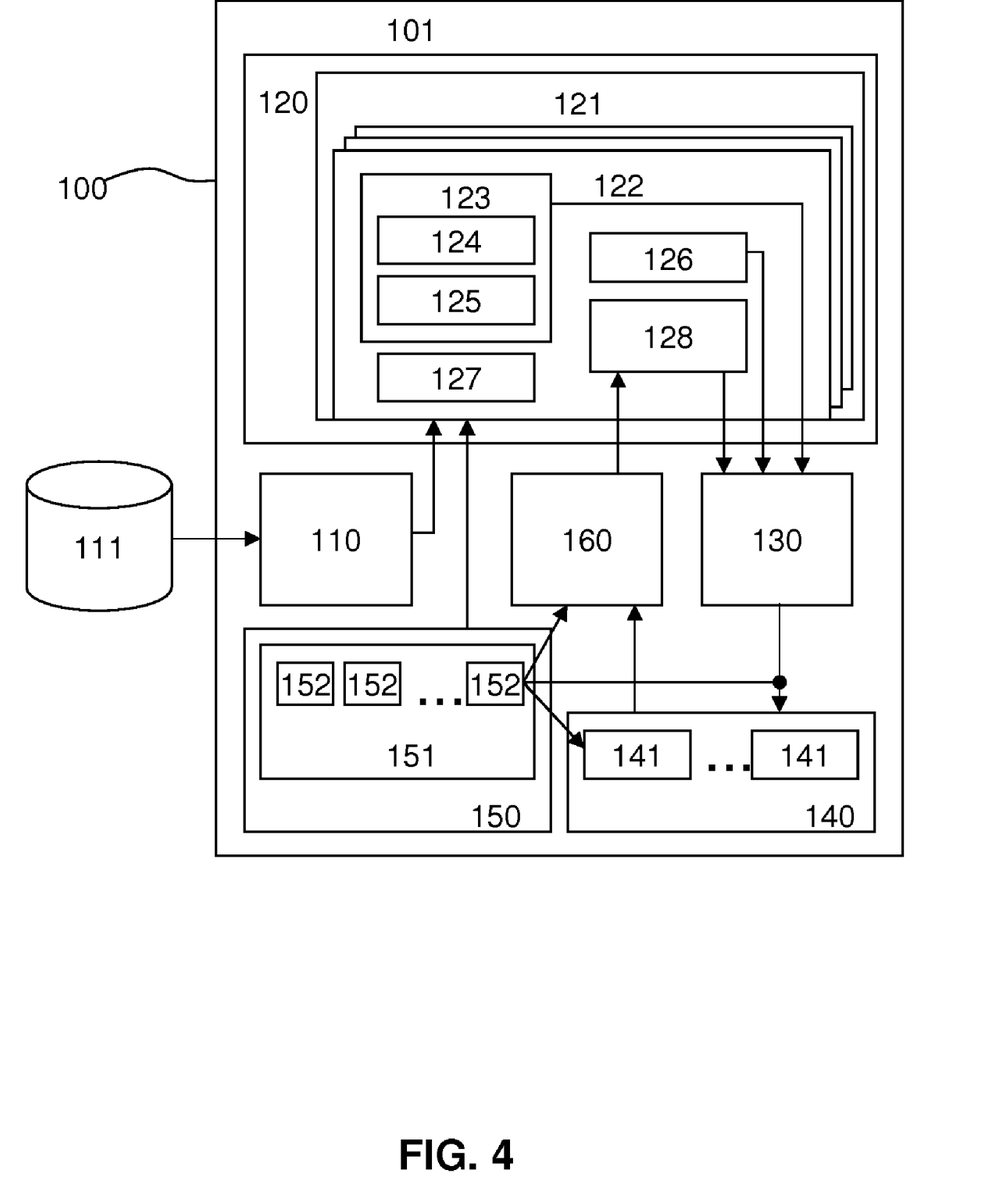
FIG. 4 shows details of the workload manager used with a computer system.

The detailed behavior of the workload manager 3 is described in more detail with reference to FIG. 4, with an exemplary computer system 100. Components of the computer system 100 correspond to those of the embodiment of FIG. 1, or are to be combined with the embodiment of FIG. 1 where applicable for proper workload manager execution. The workload manager 110 is operating based on a service definition 111 (policy) which is defined by the installation, e.g. by a user. The service definition 111 is read by the workload manager 110 during system activation from an external dataset provided outside the operating system 101. The service definition 111 contains details on service classes 121 and service goals 123. The service classes 121 are organized in a service class table 120 that is the internal representation of the data basis for the decisions made by the workload manager 110.

Each service class 121 is divided into service class periods 122. Each service class period 122 is associated with a service goal 123. A service goal 123 can be either a goal based on a response time 124 or a throughput oriented goal based on an execution velocity 125. Such a throughput oriented goal is named execution velocity goal. The response time 124 is the time in which units of work should end on average or in which a defined percentage of unit of works should end. The execution velocity 125 corresponds to an acceptable delay work is allowed to encounter when it moves through the system.

Each service class period 122 is further associated with an importance level 126. According to the importance level 126 the workload manager 110 decides which service periods 122 need preferred treatment if the system resources become short.

In order to assure that work can only consume a certain amount of resources each service class period 122 is associated with duration 127. The duration 127 is defined in consumable resource units depending on the kind of operating system in use. In case an IBM z/OS is used, such resource units are named service units, which allow normalizing the processor, storage and I/O consumption to consumable resource units. If a service class 121 comprises only one service class period 122, the duration definition is omitted and thus infinite. The same applies for the last period of the service class 121.

The service period 122 further comprises sample and management data 128 that is used during runtime of the computer system 100 to determine the goal achievement and switch of units of work from service class period to service class period.

Business units of work 152 are identified by the operating system users 150, i.e. by applications or subsystems 151 executed in the computer system 100 and controlled by the operating system. Subsystems 151 use a set of predefined interfaces to the workload manager 110 to associate a new unit of work 152 with a service class 121.

The workload manager 110 consistently collects data about the operating system resources 140. In context of the present invention the most interesting data are the resources 141 of the different central processing units (i.e. CP, zAAP, zIIP). The workload manager 110 is complemented by a data sampler 160 that collects the resource data and thus generates the sample and management data 128 of the service class periods.

The workload manager 110 uses the collected sample and management data 128 to reach decisions and influences the access of the work to the resources, i.e. controls the access of work units 152 to the operating system resources 140. These steps of deciding about the access of work units 152 are carried out in a goal management device 130, which complements the workload manager 110. Data sampler 160 and goal management device 130 can be implemented as part of the workload manager 110 or as external units closely cooperating with the workload manager 110.

The goal achievement level is implemented as a performance index (PI) describing whether a service class achieves its goal (less than or equal to 1.0) or whether the goal is missed (higher than 1.0). The performance index is calculated as follows:

$$\text{Response Time Goals:} \quad PI = \frac{ActualAchievedResponseTime}{ResponseTimeGoal}$$

$$\text{Execution Velocity Goals:} \quad PI = \frac{ExecutionVelocityGoal}{ActualAchievedExecutionVelocity}$$

Referring again to FIG. 1, workload manager component 3 supplies information about the current workload and fulfillment of performance goals to capacity provisioning manager component 5. In one embodiment a capacity provisioning component could directly retrieve such information from the monitoring interface provided by the workload manager, i.e. the IWMRCOLL and IWMRQRY programming interface provided by z/OS WLM. In another embodiment the information would be retrieved from a system monitoring product or, as in the actual embodiment, via a systems management component such as a Common Information Model (CIM) server.

Provided metrics include general information, like the number of processors, the utilization of physical processors, and the utilization of the operating system. In addition, information about the different service classes is provided. This information about service class information includes their name, the current goal achievement (PI), delay information (the reason what the workload is waiting for), and alike. In an embodiment on zSeries, monitored metrics per service class period from the workload manager include the system and SYSPLEX-wide PI values, the delay samples, including delays for specialty processors, and indicators whether the considered work is currently throttled to a defined maximum resource consumption (resource group capping). In addition, metrics on a server component 1 level and operating system component 2 are monitored. The former include the numbers and utilizations of processors per processor type, the latter include the operating systems view of numbers and utilizations of processors per processor type.

If virtualization facilities, such as zSeries Logical Partitions (LPAR) exist, additional configuration and resource consumption data from the virtualization layer 6 are being monitored, such as number and types of processors and the associated utilizations, whether such processors are shared across LPARs or dedicated to a single LPAR, whether cross-LPAR management facilities like Intelligent Resource Director (IRD) are employed, and whether capping is in effect at the virtualization layer. The monitoring subsystem collects these values for specifics durations and provides new metric values each time period. On zSeries with RMF as the monitoring subsystem the time period is usually 100 seconds.

In capacity provisioning policy 4, specific conditions are given under which temporary resources are to be activated or deactivated. Such conditions can be implemented as time conditions that specify when provisioning is allowed and/or as workload conditions. A workload condition describes the workloads that are eligible for provisioning and under which circumstances provisioning for such a workload is allowed, either by specifying a specific service class period or by a more generic filter specifying a workload priority value, i.e. service class periods with importance 2 or above. Combinations of such criteria are possible as well. Thus, description of workloads is done using service classes to ensure that resources which have been additionally provisioned (i.e., activated) by capacity provisioning manager component 5 are consistently managed by workload manager component 3.

Operation of capacity provisioning manager component 5 and its access to the data in capacity provisioning policy 4 is further described with reference to FIG. 2.

The workload has been classified into service classes and thus prioritized by workload manager 3 to reflect workload performance goals and their importance. In step 200, capacity provisioning manager 5 monitors the information provided by the workload manager 3 and, with reference to capacity provisioning policy 4, determines that a workload suffering occurs by comparing actual workload information with defined values of performance-critical workload goals in step 210. Alternatively, values of performance-critical workload goals can be determined by an automated procedure. Then, in step 220, capacity provisioning manager 5 determines which types of resources are needed to overcome the workload suffering, determines if instances of that resource types are available for activation in step 230, and performs the activation in step 240, either via a defined service of operating system 2 (operating system interface) or directly via accessing the hardware interface.

An example how to detect whether the workload is suffering is described later.

Figure 5:
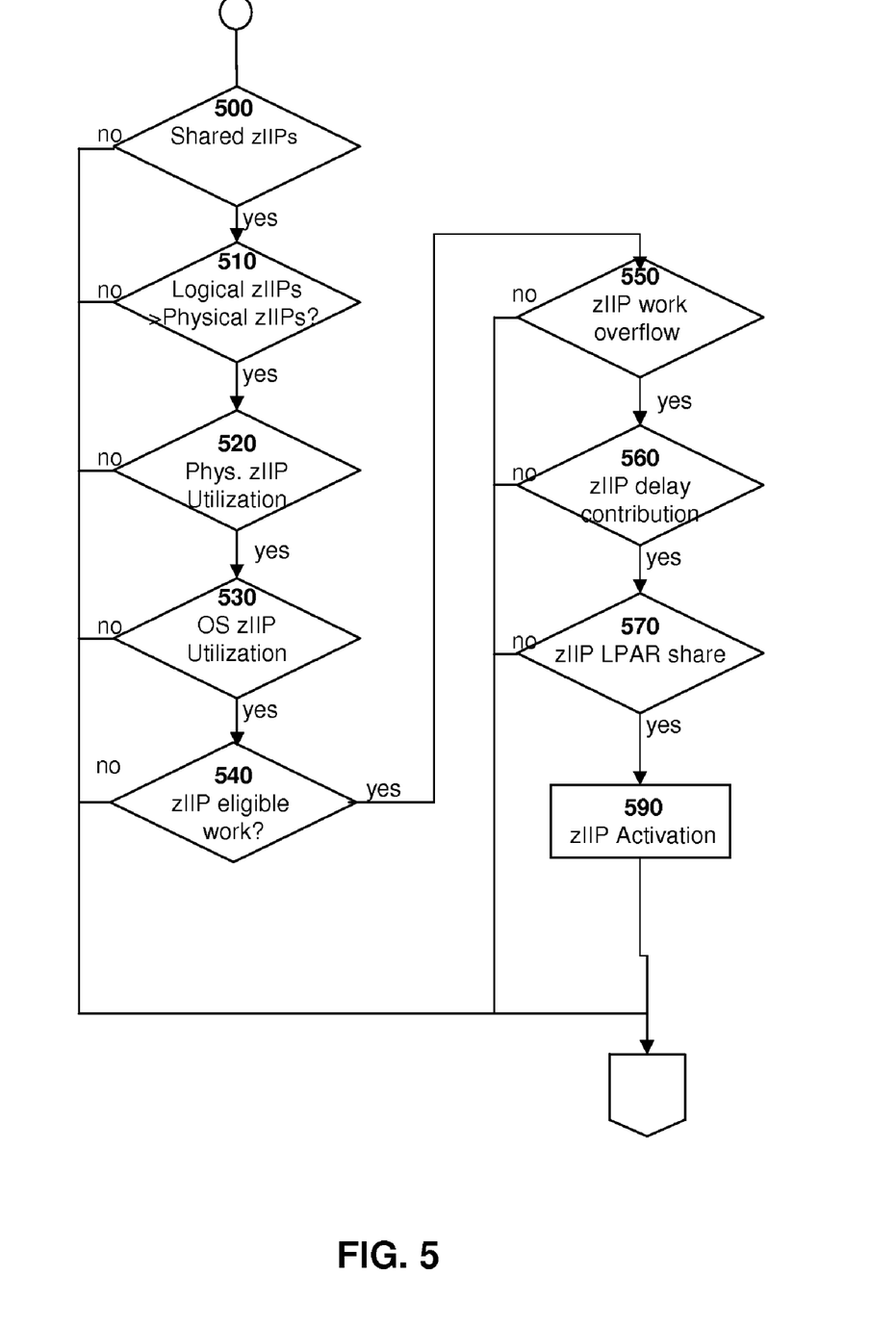
FIG. 5 is a flow diagram that shows decisions to determine whether additional zIIP special purpose processors are required.

Determining resource requirements in step 220 is based on the metric values collected in addition to the PI. In one embodiment of the invention, there is a need to determine, for example, whether additional zIIP processor capacity is required. This decision is described in FIG. 5. The provisioning manager checks first whether the operating system could consume additional processors in step 500. This is the case if the processors are shared with other operating systems and the sum of all zIIP processors of all operating systems is higher than the number of physical zIIP processors provided by the hardware. The number of all logical zIIP processors larger than the number of physical zIIP processors is determined in step 510. Then the physical utilization of the currently active zIIP processors is checked in step 520. Only if this utilization is above a specific limit, e.g. above 95%, and also the zIIP utilization from a operating system perspective is above an installation defined threshold (which is determined in step 530) the workload is checked for requiring additional zIIP processors. An additional zIIP processor would only help the workload of a service class if the considered workload is eligible for using a zIIP, the eligibility being checked in step 540. In z/OS, zIIP workload may also run on general purpose processors if the existing zIIP processors cannot process all zIIP eligible work. The fact that the existing zIIP processors cannot contain the work, and such an overflow to general purpose processors takes place, which is being detected in step 550, and the zIIP delays (the amount of times the workload is waiting for a zIIP) is a significant (or dominant) fraction of all delays (the zIIP delay contribution being detected in step 560), are further conditions that are checked. Optionally it can be verified that, based on the current partition weights, a significant share of additional zIIP resources would become available to the considered system (the zIIP LPAR share being checked in step 570). Provisioning of an additional zIIP processor (a request for which is issued in step 590) would only help if all of the above conditions are met. The method described above would be valid for all specialty processors that are likewise implemented in the server environment, such that they can be shared across multiple operating systems and an overflow of work to general purpose processors would occur. The method is similarly applicable to regular processors (i.e. CPs), by replacing check 550, because no further overflow is possible, with a check for capping conditions as detailed above.

Returning to FIG. 2, determining available resources 230 is done by querying the hardware using the SNMP communication. To check if resource activation, e.g. activating a new zIIP, is possible, the provisioning manager checks whether there is a spare processor left to be activated as zIIP. In addition the hardware must allow the activation of a zIIP processor, e.g. the user has already paid for or is willing to pay for the activation. Last, the provisioning manager checks that less than the allowed maximum number of zIIPs is already active. Similar checks are performed for all types of resources determined as missing in the previous step.

All resources detected as missing and available to be activated in the hardware are activated in step 240 using the SNMP commands to activate the resources. The request to activate resources needs the information about the type of resources and the quantity to activate.

Figure 2:
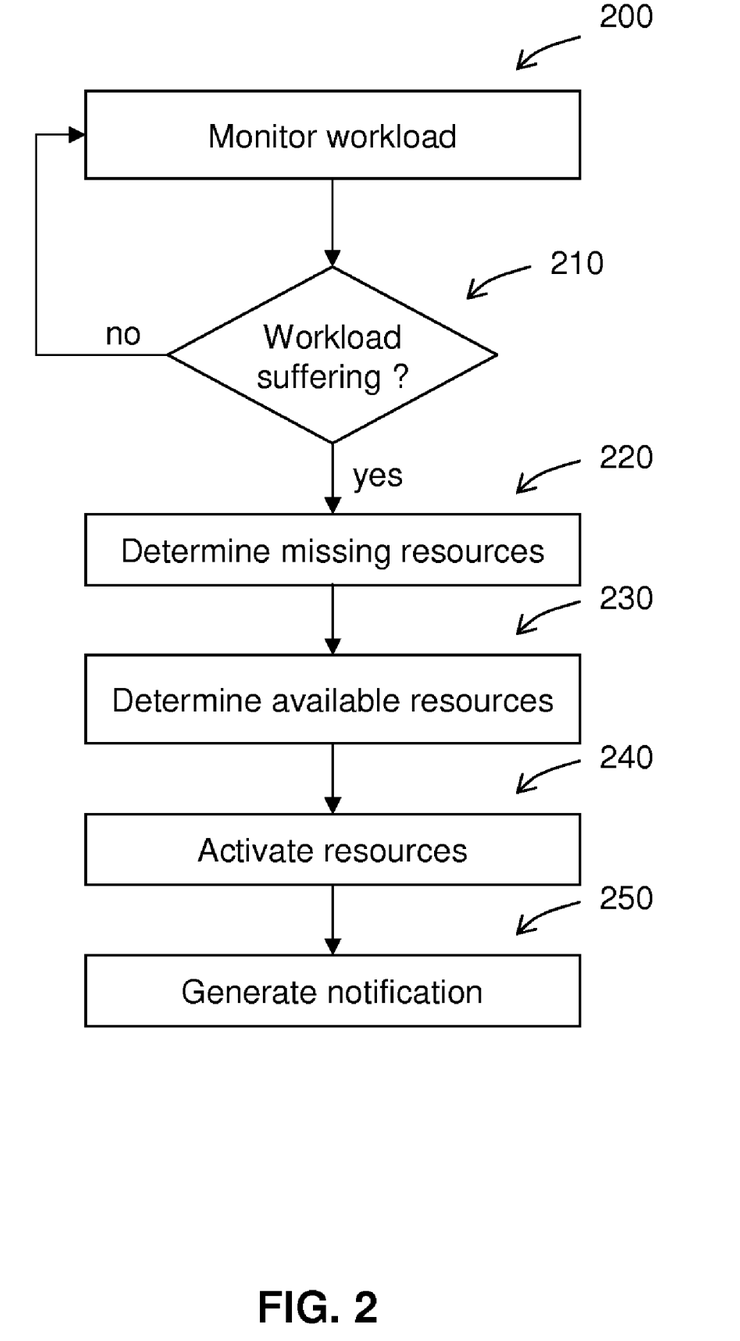
FIG. 2 is a flow diagram showing an overview of an embodiment of the method according to the present invention.

In FIG. 2, step 250, a notification and/or data is generated that allows the vendor of system 1 to determine which resources have been activated since initial start-up and/or the previous activation procedure. For this, capacity provisioning manager 5 comprises appropriate data generation functionality. Finally, capacity provisioning manager 5 reports the resources thus additionally provisioned to the workload manager component 3 to be considered in assignment of programs to resources, if needed.

In the same manner, resources may be deactivated upon workload being significantly low when comparing actual workload information with defined values of performance-critical workload goals in step 210.

Subcomponents of an embodiment of capacity provisioning manager component 5 and their operation are described in more detail with reference to FIG. 3.

Figure 3:
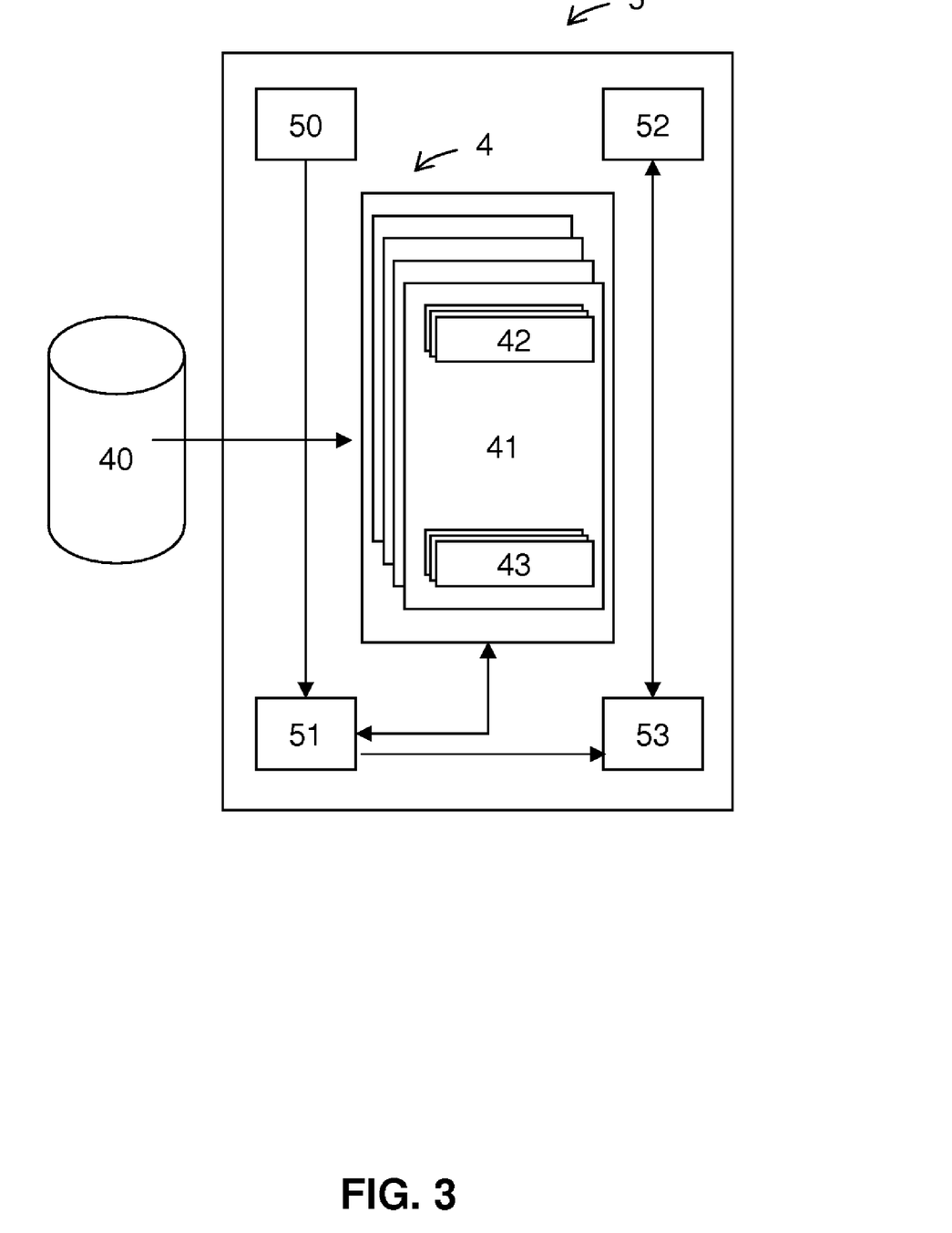
FIG. 3 is a block diagram showing components of the capacity provisioning manager component.

In FIG. 3, capacity provisioning policy 4 is shown as comprised within the capacity provisioning manager 5 for purposes of illustration only. The policy is instantiated from a policy structure on disk 40. In capacity provisioning policy 4, provisioning conditions 41 specify the conditions under which provisioning is to be performed. A provisioning condition specifies a workload condition 42 that specify the condition for one or more specific workloads. Such conditions are based on goals for performance-critical workloads. Corresponding to the specification of goal achievement with a workload manager component 3, provisioning triggers are expressed as a performance index value (PI). In capacity provisioning policy 4, however, a condition is given depending on the PI of specific service class periods being above a specific value for a specific time period. If such a condition is fulfilled, activation of resources is generally allowable. As an example, activation of resources is allowed for service class TURBINE CONTROL if the PI is above 1.7 for more than 15 minutes.

In the same way as for provisioning, depending on conditions given in the capacity provisioning policy 4, active temporary resources can be deactivated if the goal achievement is better than a specific value for a specified time, for example deactivate the resources if the PI for service class TURBINE CONTROL is below 1.2 for more than 10 minutes.

Further, instead of specifying which instances of resources should be activated, a contingent of resources that the CPM is allowed to activate can be specified or determined automatically. For example, it can be specified in the policy that a maximum of 2 general purpose processors, 1 zAAP processor and 3 zIIP processors are allowable for activation. Another possibility to obtain this number is to manage all resources available to the hardware. To allow this, the hardware API to query the amount of temporary capacity can be used.

Which resources are actually activated, and when, is determined by the CPM as will be explained in the following.

Based on time conditions given in the capacity provisioning policy 4, which is here illustrated as comprised within the capacity provisioning manager 5 as an example only, capacity provisioning manager 5 invokes the metric monitor component 50. Thus, only if the time conditions 43 allow activation, monitoring is performed, and if no time condition is satisfied, the monitor is stopped to reduce the processing effort imposed by the monitoring. A time condition 43 specifies at least a start time when the workload condition 42 should be checked and an end time when the workload conditions should no longer be checked. The monitoring is done stepwise, as following: first, data about the utilization of the operating system and the hardware are examined. If these indicate that resources are constrained, then data about the service class periods are retrieved and examined to check whether this affects the important workload.

When monitoring is active and workload metrics are retrieved, workload analyzer component 51 analyzes these data for each service class. The first indication is the performance index (PI). Based on this metric, workload analyzer component 51 examines whether the workload condition 42 is satisfied.

Thus, when the PI exceeds the provisioning PI limit for the time specified with the provisioning criterion, the service class is marked as "worth provisioning" and reported to the provisioning planner component 53. Since the PI merely contains information about the goal achievement of a service class and is missing information, which resources are needed and would help, the indication to the planner 53 is enriched with such information by examining further metrics before reporting.

As an example, a typical reason for workload suffering can be waiting for processors or an input/output-operation to take place. Thus, for each service class being in a "worth provisioning"-state, workload analyzer component 51 analyzes the reasons, as indicated by respective sources of occurring delays. If, for instance, the main reason is waiting for general purpose processors (CPU delay), then it indicates that an additional general purpose processor would help. Similar checks can be done for any other resource, e.g. specialty processors (zAAP delay, zIIP delay), memory, or IO.

However, in such case, namely when general purpose processor capacity is missing, still further metrics are analyzed, since in some cases workload for specialty processors is performed on general purpose processors if the specialty processor is full. In such cases also a specialty processor could help even if the main reason has been found to be missing general purpose processor capacity. Therefore, the method described above referring to FIG. 5, to determine if additional specialty processors (i.e. zIIPs, zAAPs) are required, is executed first. If the result shows that a specialty processor would not help, the method, described above, for general purpose processors is executed. This shows that for a workload suffering state, there can be a multiplicity of resources that may help to overcome the workload suffering.

On the other hand, if the workload analyzer 51 detects that the PI gets below the de-provisioning PI limit, as specified in the capacity provisioning policy 4, for the time period defined as the de-provisioning duration, then the provisioning worth situation is marked as "meeting sufficient resources", i.e. more than sufficient resources are available to achieve the predefined goals for this service class, so that this "surplus" of resources can be freed or assigned to other suffering service classes.

Subsequently, the provisioning planner component 53 receives the information from the workload analyzer 51 and collects information about available temporary resources from resource management component 52, which serves as the interface component to the hardware 1. Provisioning planner component 53 then coordinates the activations and/or deactivation of these resources. Since there can be multiple workloads on multiple systems on each hardware, the planning process first aggregates (sums up) all of the different workload suffering states and then evaluates whether additional resources need to be activated or whether activated resources can be deactivated. If the sum of demands is below the current activation level, currently active resources can be deactivated. On the contrary, if the sum of all demands is above the current activation level, then resources need to be activated.

This is done because in systems that usually process many different types of work simultaneously, with only some of them being performance critical, straightforward activation of resources whenever a workload is suffering, as is performed in some distributed environments, does not produce satisfying results, particularly when temporary resources are limited as well as associated with significant hardware and software costs. Hence, temporary resources should only be activated when it is really necessary from a performance criticality perspective.

In some scenarios, planner component 53 is performing only one activation/deactivation operation at a time to allow the resource distributing mechanism, e.g. the workload manager 3, to adjust to the new situation and to appropriately redistribute available resources. For this, the planner component 53 may define an idle period, for instance about 15 minutes, in which no activation or deactivation operations are being performed. In cases where there is a need for resource activations while other resources could be deactivated, it is preferable to first deactivate resources, if possible, before activating additional resources, to optimize for cost.

If the planner component 53 detects that resources need to be activated and resource management component 52 reports that these resources are available, the planner needs to decide which resources are to be activated first. Since there are different costs associated with each resource, first the cheapest resource is activated, followed by the second-cheapest, and so forth. Therefore, for zSeries processors first zIIPs or zAAPs and then general purpose processors (CPs) are activated. Additionally, an operator may be notified to confirm such a selection and/or manually select a resource.

Once a decision for activation or deactivation of temporary resources exists, the planner component 53 instructs resource management component 52 to perform the action, which delegates it further to the hardware 1.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To avoid unnecessary repetitions, explanations given for one of the various embodiments are intended to refer to the other embodiments as well, where applicable. In and between all embodiments, identical reference signs refer to elements of the same kind. Moreover, reference signs in the claims shall not be construed as limiting the scope. The use of "comprising" in this application does not mean to exclude other elements or steps and the use of "a" or "an" does not exclude a plurality. A single unit or element may fulfill the functions of a plurality of means recited in the claims.

APPENDIX

Reference Numerals
1 Hardware platform
2 Operating system
3 Workload manager component
4 Capacity provisioning policy 5 Capacity provisioning manager component
6 Optional virtual hardware platform, such as zSeries LPAR
40 Policy structure on disk
41 Provisioning condition
42 Workload condition
43 Time condition
50 Metric monitor component
51 Workload analyzer component
52 Resource manager component
53 Provisioning planner component
100 Computer system
101 Operating system
110 Workload manager
111 Service definition
120 Service class table
121 Service class
122 Service class period
123 Service goal
124 Response time
125 Execution velocity
126 Importance level
127 Duration
128 Sample and management data
130 Goal management device
140 Operating system resource
141 CPU resource
150 Operating system user
151 Subsystem
152 Unit of work
160 Data sampler
200 Monitor workload
210 Determine workload suffering
220 Determine type of missing resources
230 Determine available resources
240 Activate resources
250 Generate notification
500 Check for shared processors
510 Check number of all logical zIIP processors larger than number of physical zIIP processors
520 Check utilization of physical zIIP utilization
530 Check MVS zIIP utilization
540 Check for eligibility of work to run on zIIP processors
550 Check whether zIIP work flows over to general purpose processors
560 Check zIIP delay contribution
570 Check zIIP LPAR share
590 Request activation of zIIP processors

What is claimed is:

1. A method of autonomous provisioning of resources of a computer system, comprising:
monitoring performance-critical workload of the computer system;
detecting workload suffering defined by workload suffering states and based on comparing the performance-critical workload with defined values of performance-critical workload goals;
identifying the workload suffering states of the computer system;
determining types of missing resources contributing to the workload suffering;
determining additional resources available for activation to replace the types of missing resources;
identifying a current activation level based on a number of resources that are active;
aggregating the workload suffering states to calculate a sum of demands;
evaluating a need for the additional resources based on the calculated sum of demands, the need presented by the workload suffering;
in response to the calculated sum of demands being below the current activation level, deactivating currently activated resource; and
in response to the calculated sum of demands being above the current activation level, activating the additional resources,
wherein detecting workload suffering comprises calculating a performance index value for at least one of response time goals and execution velocity goals,
wherein detecting workload suffering further comprises detecting if the calculated performance index value exceeds a given threshold value for a given amount of time.

2. A method according to claim 1, wherein the performance-critical workload is classified in service classes.

3. A method according to claim 2, wherein the performance-critical workload is prioritized by mapping it to service classes to reflect the performance-critical workload goals.

4. A method according to claim 1, wherein detecting workload suffering comprises evaluating if a difference evaluated from comparing the performance-critical workload with defined values of performance-critical workload goals matches a certain condition.

5. A method according to claim 4, wherein the condition is selected from a capacity provisioning policy.

6. A method according to claim 1, wherein the additional resources are activated using a defined interface to an operating system of the computer system.

7. A method according to claim 1, wherein the additional resources comprise hardware components having an interface for being activated.

8. The method of claim 1, comprising the further step of:
generating a notification of the activation for being sent to a system provider for automated billing of added capacity.

9. A method according to claim 8, wherein generating a notification comprises including information enabling to determine which resources have been activated since at least one of a previous activation procedure and initial startup of the computer system.

10. A method according to claim 1, wherein monitoring of performance-critical workload and detecting workload suffering is performed by a workload manager component.

11. A method according to claim 1, wherein a portion of the resources of the computer system are deactivated based on comparing the performance-critical workload with defined values of performance-critical workload goals.

12. A method according to claim 1, wherein determining resource requirements comprises detecting if additional processor capacity of a given type is required, including the following steps:
determining if processors of the computer system are shared with other operating systems;
determining if a sum of all processors associated with the computer system and the other operating systems is higher than a number of physical processors;
determining if an amount of logical processors exceeds the number of physical processors;
determining if a physical utilization of currently active processors exceeds a given threshold;
determining if operating system utilization of the currently active processors exceeds a given threshold; and determining if there is workload suffering in response to sharing processors with the other operating systems.

13. A method according to claim 12, wherein detecting if additional processor capacity of a given type is required further comprises one or more of the following steps:
   detecting a work overflow of processors of such type;
   determining a delay contribution value of processors of such type;
   determining a share of the processors of such type in the logical partition; and issuing a request for activation of one or more processors of such type.

14. A computer program product stored on a non-transitory computer readable medium, comprising a program for causing a computer to perform a method comprising:
   monitoring performance-critical workload of the computer system;
   detecting workload suffering defined by workload suffering states and based on comparing the performance-critical workload with defined values of performance-critical workload goals;
   identifying the workload suffering states of the computer system;
   determining types of missing resources contributing to the workload suffering;
   determining additional resources available for activation to replace the types of missing resources;
   identifying a current activation level based on a number of resources that are active;
   aggregating the workload suffering states to calculate a sum of demands;
   evaluating a need for the additional resources based on the calculated sum of demands, the need presented by the workload suffering;
   in response to the calculated sum of demands being below the current activation level, deactivating currently activated resource; and
   in response to the calculated sum of demands being above the current activation level, activating the additional resources,
   wherein detecting workload suffering comprises calculating a performance index value for at least one of response time goals and execution velocity goals,
   wherein detecting workload suffering further comprises detecting if the calculated performance index value exceeds a given threshold value for a given amount of time.

15. A computer device for autonomous provisioning of resources of a computer system, comprising a workload manager component, characterized in that it further comprises a capacity provisioning manager component coupled to the workload manager component, the computer device comprising:
   a metric monitor component configured to, by a processor, monitor performance-critical workload of the computer system based on workload information received from the workload manager component, and to identify a current activation level based on additional resources;
   a workload analyzer component configured to, by the processor, detect a workload suffering event and workload suffering states related to the workload suffering event of the computer system based on comparing the performance-critical workload with defined values of performance-critical workload goals, and further configured to determine types of missing resources contributing to the workload suffering event,
   wherein detecting workload suffering comprises calculating a performance index value for at least one of response time goals and execution velocity goals;
   wherein detecting workload suffering further comprises detecting if the calculated performance index value exceeds a given threshold value for a given amount of time;
   a provisioning planner component configured to, by the processor, coordinate a plurality of workload suffering events and control resource activation, including:
   aggregating, by the processor, the workload suffering states to calculate a sum of demands;
   evaluating, by the processor, a need for the additional resources, based on the calculated sum of demands, to replace the types of missing resources, the need presented by the workload suffering event;
   in response to the calculated sum of demands being below the current activation level, deactivating, by the processor, currently activated resource; and
   in response to the calculated sum of demands being above the current activation level, activating, by the processor, the additional resources;
   a resource manager component configured to, by the processor, determine additional resources available for activation and to perform resource activation.

16. The computer device of claim 15, wherein the capacity provisioning manager component is coupled to a data storage comprising a capacity provisioning policy that contains statements of condition for activating resources, the capacity provisioning policy being evaluated by the workload analyzer component for performing the comparison between the performance-critical workload and defined values of performance-critical workload goals.

17. The computer device of claim 16, wherein the statements of condition are at least one of time conditions and service class conditions.

18. The computer device of claim 15, wherein the provisioning planner component is configured to aggregate workload suffering events and evaluates whether additional resources need to be activated.

19. The computer device of claim 15, wherein the resource manager component is further configured to perform resource deactivation and provisioning planner component is further configured to determine whether currently active resources can be deactivated based on the aggregated workload suffering events.

* * * * *